(12) United States Patent
Su et al.

(10) Patent No.: US 10,069,248 B2
(45) Date of Patent: Sep. 4, 2018

(54) CONNECTOR HOUSING WITH HEAT DISSIPATION STRUCTURE

(71) Applicant: NEXTRONICS ENGINEERING CORP., New Taipei (TW)

(72) Inventors: Hou-An Su, Keelung (TW); Ding Yong Zeng, Hunan (CN)

(73) Assignee: NEXTRONICS ENGINEERING CORP., New Taipei (TW)

( * ) Notice: Subject to any disclaimer, the term of this patent is extended or adjusted under 35 U.S.C. 154(b) by 229 days.

(21) Appl. No.: 15/136,008

(22) Filed: Apr. 22, 2016

(65) Prior Publication Data

US 2017/0214170 A1 Jul. 27, 2017

(30) Foreign Application Priority Data

Jan. 21, 2016 (CN) .......................... 2016 1 0040319
Feb. 1, 2016 (TW) .............................. 105103127 A

(51) Int. Cl.
*H01R 13/658* (2011.01)
*H01R 13/6583* (2011.01)
*H01R 13/717* (2006.01)
*G02B 6/42* (2006.01)

(52) U.S. Cl.
CPC ........... *H01R 13/6583* (2013.01); *G02B 6/42* (2013.01); *G02B 6/4269* (2013.01); *H01R 13/7172* (2013.01)

(58) Field of Classification Search
CPC ... G02B 6/42; H01R 13/7172; H01R 13/6583
See application file for complete search history.

(56) References Cited

U.S. PATENT DOCUMENTS

| | | | | |
|---|---|---|---|---|
| 7,539,018 | B2 * | 5/2009 | Murr ................... | H05K 7/20418 165/185 |
| 7,601,021 | B1 * | 10/2009 | Yang .................... | G02B 6/0008 439/487 |
| 8,449,331 | B2 * | 5/2013 | Phillips .............. | H01R 13/6581 361/704 |
| 9,402,332 | B2 * | 7/2016 | McKervey ......... | H05K 7/20009 |
| 9,696,506 | B2 * | 7/2017 | Wu ..................... | H05K 7/20409 |

* cited by examiner

*Primary Examiner* — Felix O Figueroa
(74) *Attorney, Agent, or Firm* — Li & Cai Intellectual Property (USA) Office

(57) ABSTRACT

A connector housing with heat dissipation structure includes a housing, a heat dissipation unit and a holding member. A first end part of the holding member is fixed to a top plate of the housing by using a first tongue piece engaged with a fastening piece, so an area of an opening of top plate is decreased and the EMI shielding effect is better. Two side arms of the holding member pass through the trenches inside the heat dissipation unit, such that the width of the heat dissipation unit is not limited and a heat dissipation area can be increased. The second end part of the holding member includes a second tongue piece plugged into a convex hull at a back cover, and an arrival end of the second end part withstands a stop part, so the holding member is not released easily and can endure an external force.

7 Claims, 9 Drawing Sheets

CONNECTOR HOUSING WITH HEAT DISSIPATION STRUCTURE

BACKGROUND

1. Technical Field

The present disclosure is related to a connector housing with heat dissipation structure, and more particularly, to a connector housing with heat dissipation structure adapted to a Quad Small Form-factor Pluggable Plus.

2. Description of Related Art

Transceivers are utilized to interconnect circuit cards of communication links and other electronic modules or assemblies. Various international and industry standards define the type of connectors used to connect computers to external communication devices, such as modems, network connectors, and other transceivers. A well-known type of transceiver module developed by an industry consortium and known as a Gigabit Connector Converter (GBIC) provides a connection between a computer and an Ethernet, Fiber Channel, or another data communication environment.

It is desirable to miniaturize transceivers in order to increase the port density at a network connection (at switch boxes, cabling patch panels, wiring closets, computer I/O, etc.). Quad small form-factor pluggable plus (QSFP+) transceiver modules were developed to meet this need. QSFP+ transceivers are less than one half the size of a GBIC transceiver, allowing higher aggregated data throughput in a communication system.

The traditional Quad small form-factor pluggable plus transceiver module has a heat dissipation unit disposed on the housing. The heat dissipation unit is fixed to the connector housing by means of a locking member with horizontal or vertical engaged structure. However, the traditional heat dissipation unit engages with an opening of the connector housing by the locking member, and the EMI shielding effects is decreased due to the opening. Moreover, the structure strength of the traditional locking member is weak, so the locking member is detached and damages easily.

In summary, the inventor of this instant disclosure has contributed to research and developed a new connector housing with a heat dissipation structure of the instant disclosure to overcome the abovementioned drawbacks.

SUMMARY OF THE DISCLOSURE

One object of the instant disclosure is to provide a connector housing with a heat dissipation structure, an area of an opening of a top plate can be decreased enhancing the EMI shielding effect accordingly, furthermore, the holding member is not detached easily and can endure an external force, and the heat dissipation area of the heat dissipation unit is increased thereby.

In order to overcome the abovementioned problems, the present disclosure provides a connector housing with heat dissipation structure, includes a housing made of metal, and the housing comprises a top plate, two side walls, a bottom plate, and a back cover. The top plate has an orifice and a fasten piece, the orifice penetrates through the top plate, the fasten piece is disposed in front of the orifice, the fasten piece protrudes outward from an outer surface of the top plate, and two ends of the fasten piece are connected to the top plate. A first slot is formed inside the fasten piece, and a front side and a back side of the fasten piece are formed with a recess respectively. The top plate is formed with an opening below the fasten piece. The back cover has a convex hull and a stop part, and the convex hull and the stop part protrude outward from an outer surface of the back cover, and a second slot is formed inside the convex hull. The bottom side of the convex hull is formed with an opening, and the stop part disposed below the convex hull. A heat dissipation unit has a base, a plurality of fins connected to the base, and a plurality of trenches formed between the fins. The trenches extend along a fins arrangement direction, and a conducting block is disposed in the bottom side of the base. The heat dissipation unit is disposed in the top plate of the housing, so the conducting block penetrates through the orifice and enters an interior space of the housing. A holding member has a first end part, a second end part, and two side arms. The two side arms are arranged at regular intervals, and a cross section of the two side arms is with a U shape, one end of the two side arms is connected to the first end part, another end of the two side arms is connected to the second end part. A front end of the first end part is formed with a first tongue piece, and the second end part is formed with a hatch. A second tongue piece is formed in a lower portion of the hatch, and an arrival end is formed in a lower portion of the second end part. The first end part and the second end part are formed with a spring respectively, and the spring having a front portion. The first tongue piece of the first end part of the holding member inserts into the first slot of the fasten piece, and the two side arms of the holding member are accommodated into the trenches of the heat dissipation unit. The second tongue piece of the second end part of the holding member inserts into the second slot of the convex hull, and the arrival end of the second end part abuts against the stop part. The front portion of the spring abuts against the base of the heat dissipation unit, so the heat dissipation unit is fixed to the top plate of the housing.

The instant disclosure has the following advantages.

The first part of the holding member of the instant disclosure engages with the top plate of the housing by the first tongue piece and fasten piece, so the area of the opening of the top plate can be decreased and the EMI shielding effect is better accordingly. The side arm of the holding member penetrates through the interior space of the heat dissipation unit, so the width of the heat dissipation unit is not limited and the heat dissipation area is increased thereby. The second end part of the holding member of the instant disclosure includes the second tongue piece inserted into the convex hull of the back cover of the housing, and the arrival end of the second end part abuts against the stop part, so the holding member is not released easily and can bear an external force to prevent damage.

The first end part of the holding member of the instant disclosure is further formed with a supporting portion abutted against the top plate of the housing, as abovementioned, the holding member cannot be detached easily and can bear an external force to prevent damage.

The cross section of the two side arms of the holding member of the instant disclosure is with a U shape, so the structure strength of the holding member is increased.

The holding member of the instant disclosure further includes a spring, and the spring provides a good elastic force even if the spring is impacted by an external force. The heat dissipation effect of the heat dissipation unit is reliable, and the heat dissipation unit can be modified according to the height of the connector housing as required.

The first end part and the second end part of the instant disclosure further comprise a fixing part respectively to secure a light pipe, and the holding member can be modified according to the type of the light pipe to adapt a single mode, twin mode, or four mode type light pipes.

Both sides of the base of the heat dissipation unit of the instant disclosure have a protruding portion and a concave portion respectively and are arranged in an interlaced configuration, so a plurality of the heat dissipation units can be integrated as one body, and the heat dissipation area of the heat dissipation unit is increased. The protruding portion and the concave portion arranged in the interlaced configuration touch a division plate, so the housing can bear an external force and prevent damage and collapse.

In order to further appreciate the characteristics and technical contents of the present disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

[First Embodiment]

Figure 1:
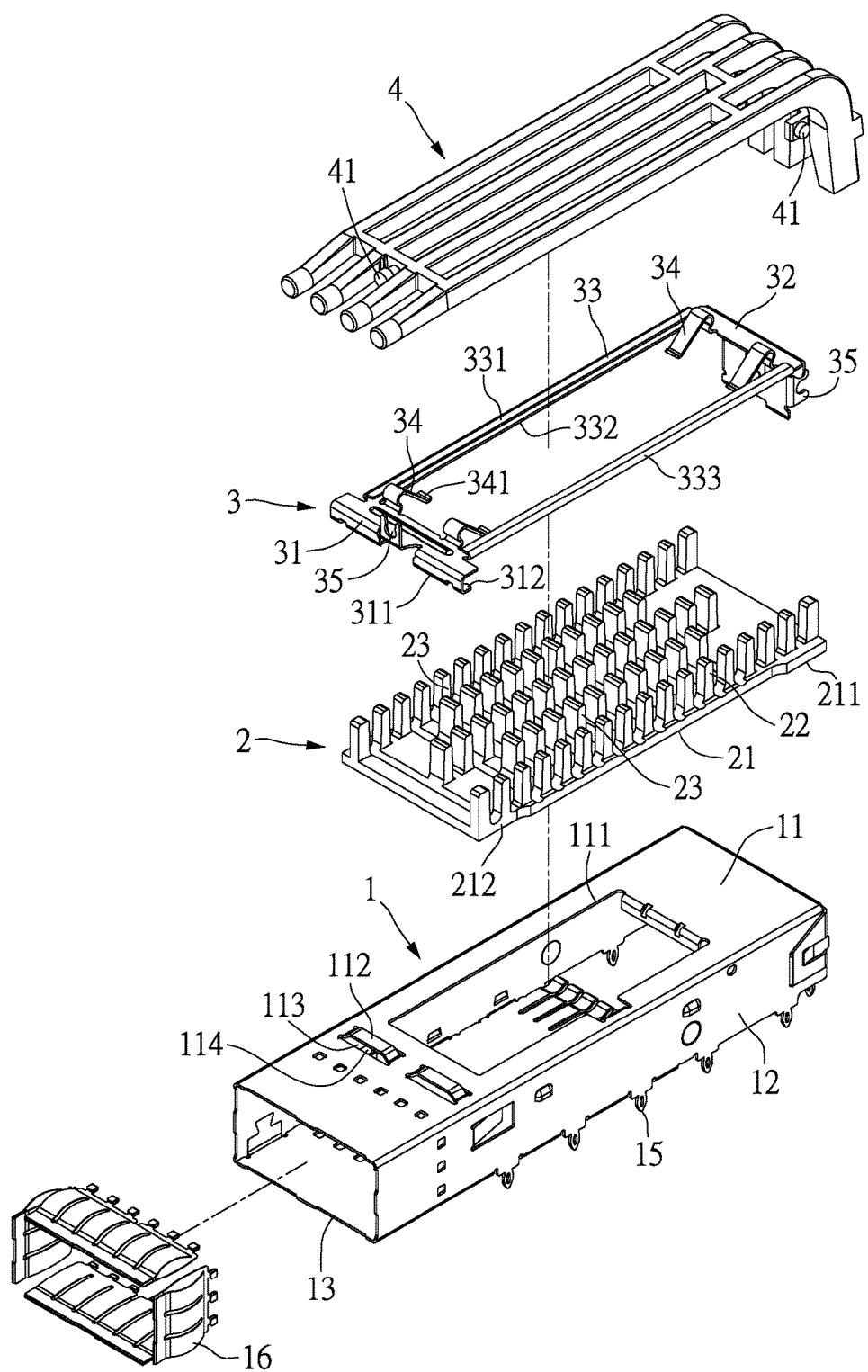
FIG. 1 shows an exploded view of a connector housing with heat dissipation structure according to a first embodiment of the instant disclosure.
Figure 2:
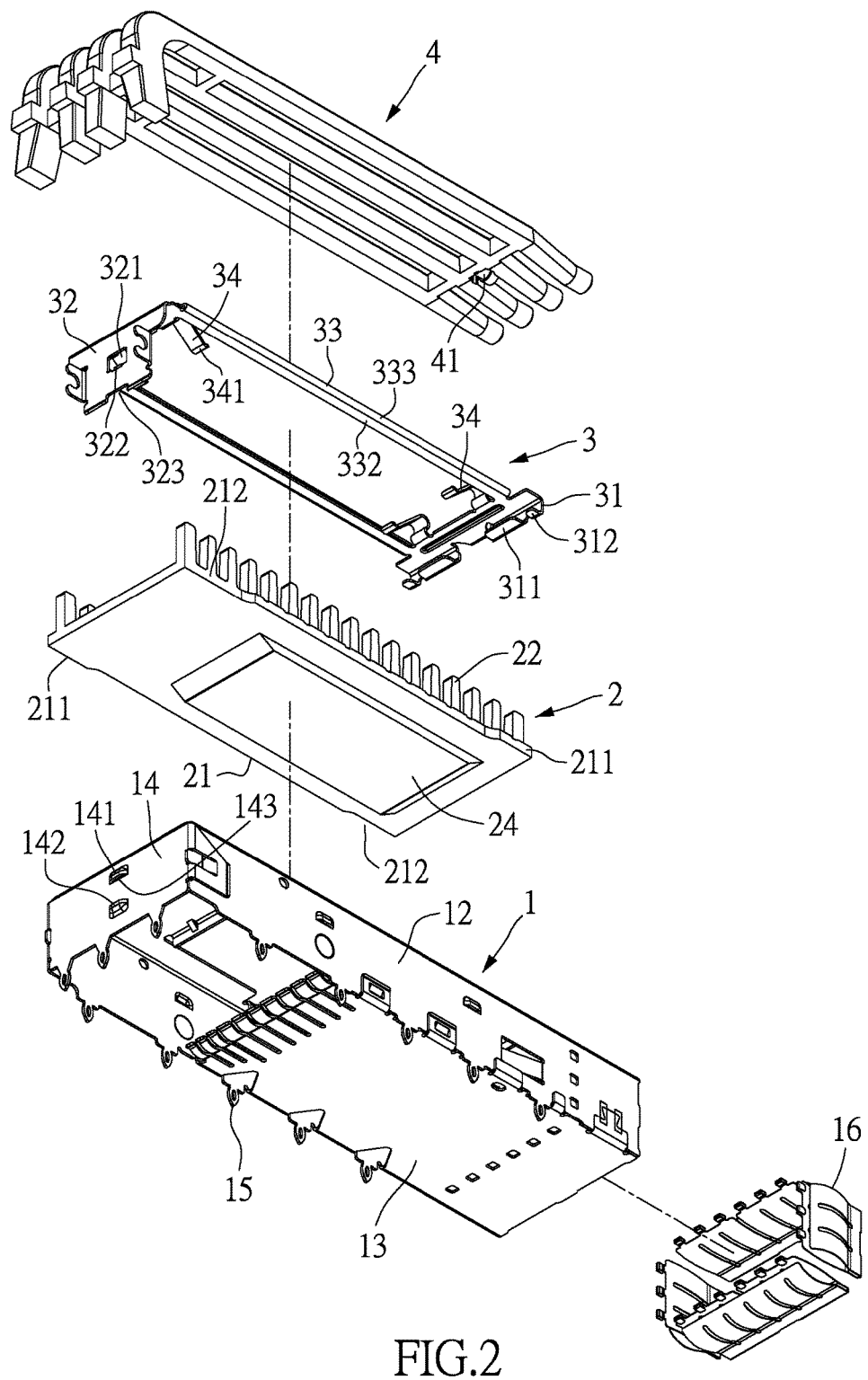
FIG. 2 shows an another exploded view of the connector housing with heat dissipation structure according to the first embodiment of the instant disclosure.
Figure 3:
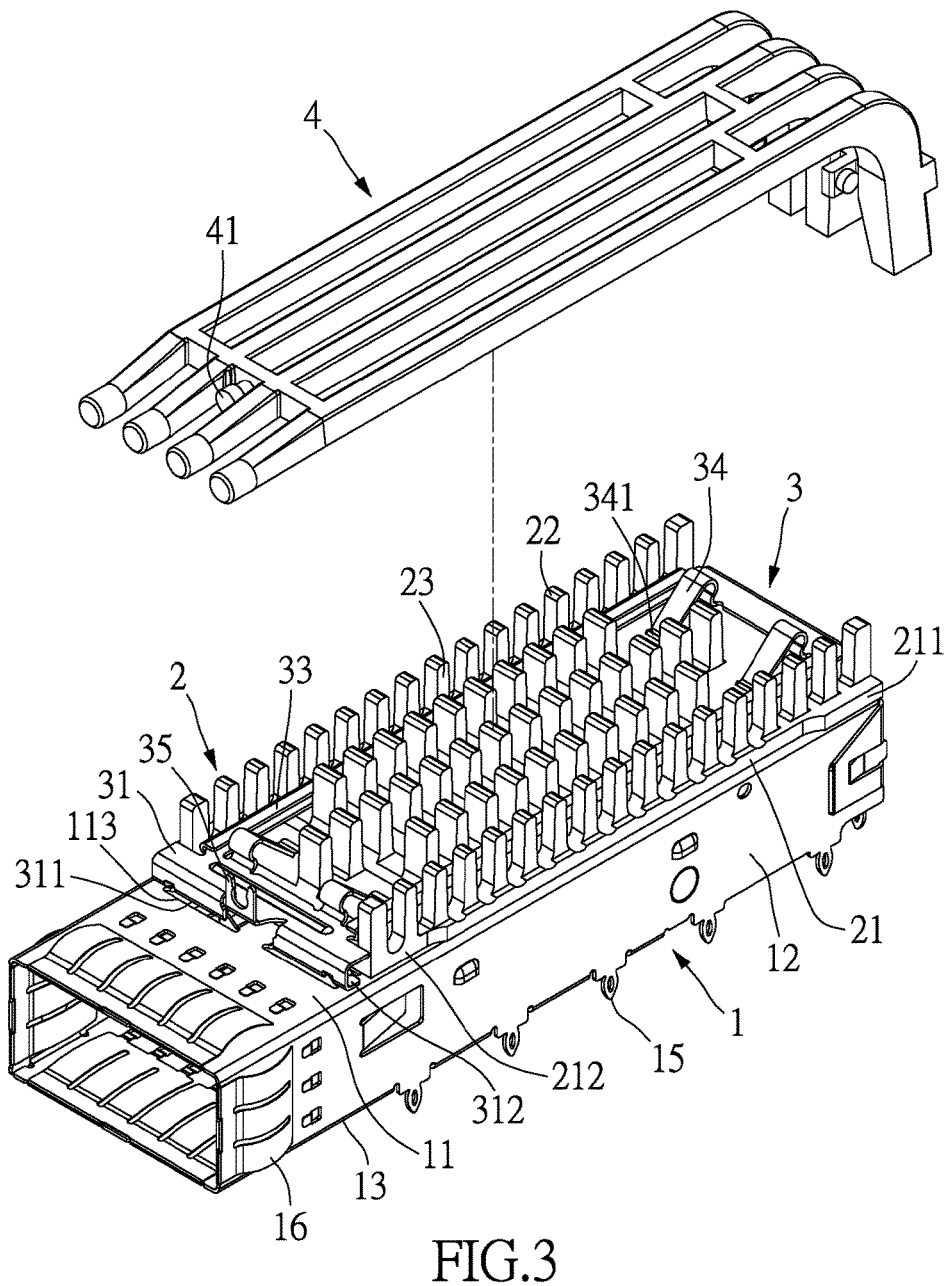
FIG. 3 shows a perspective view of the connector housing with heat dissipation structure according to the first embodiment of the instant disclosure (the light pipe is detached)
Figure 4:
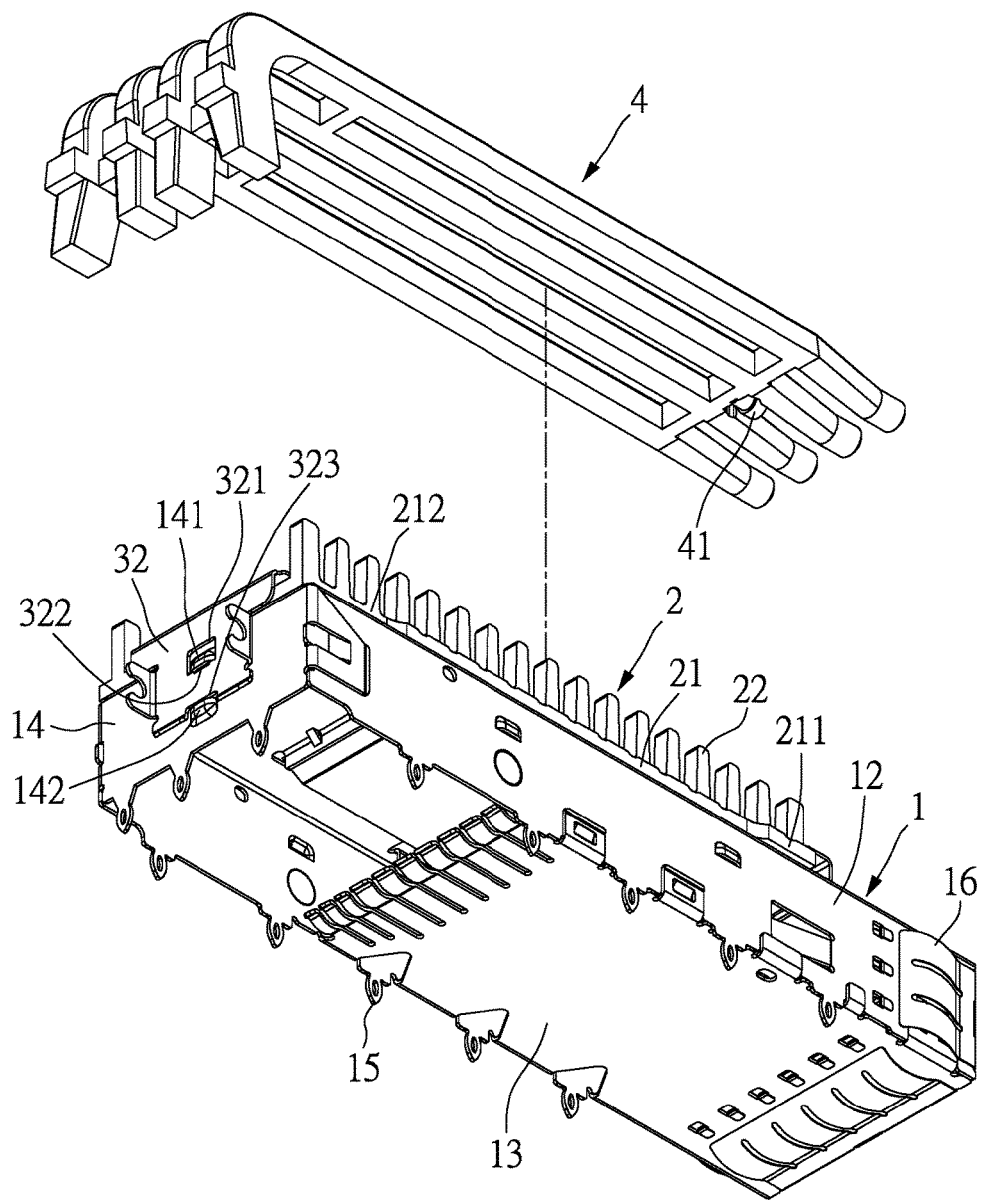
FIG. 4 shows an another perspective view of the connector housing with heat dissipation structure according to the first embodiment of the instant disclosure (the light pipe is detached)
Figure 5:
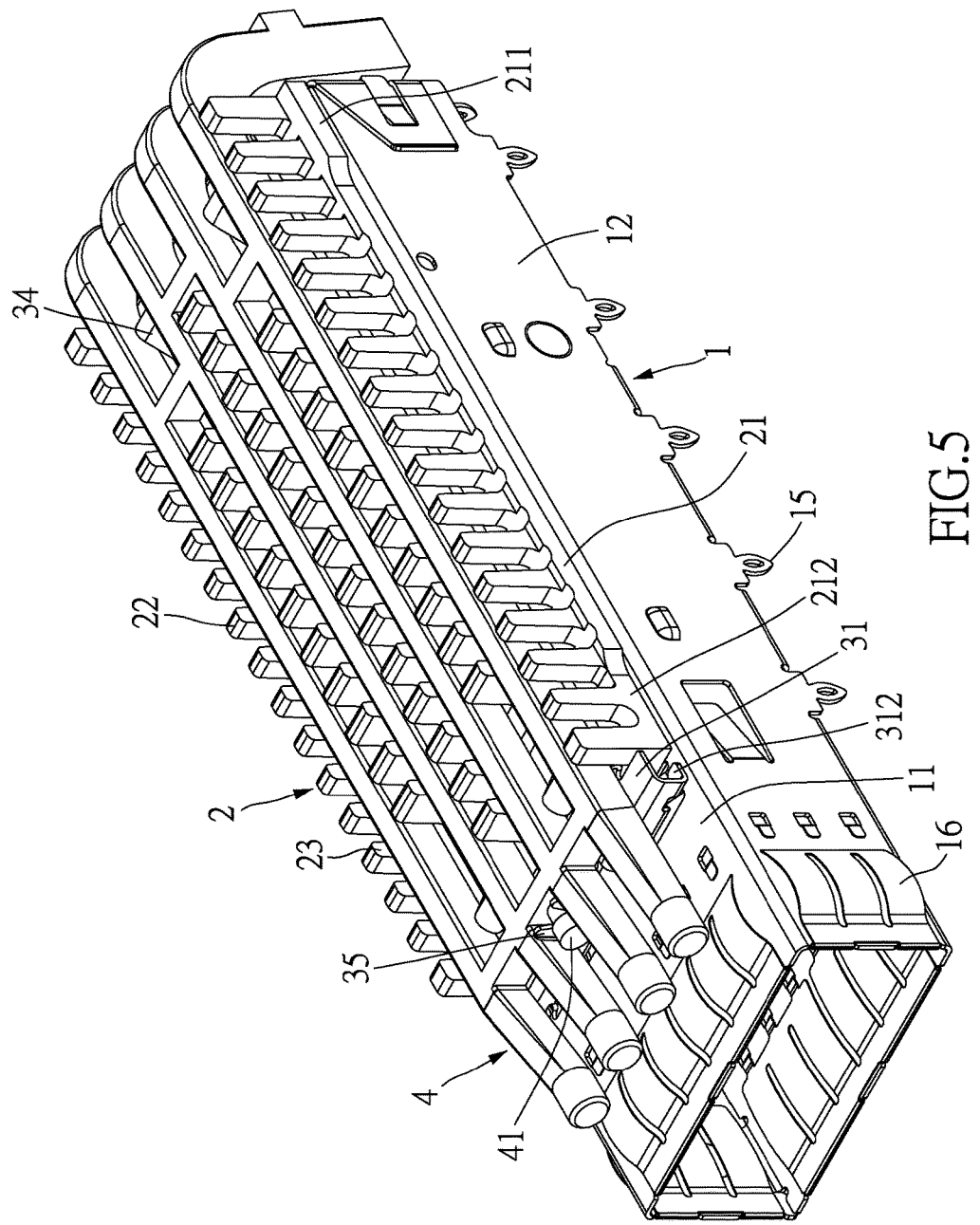
FIG. 5 shows a perspective view of the connector housing with heat dissipation structure according to the first embodiment of the instant disclosure.
Figure 6:
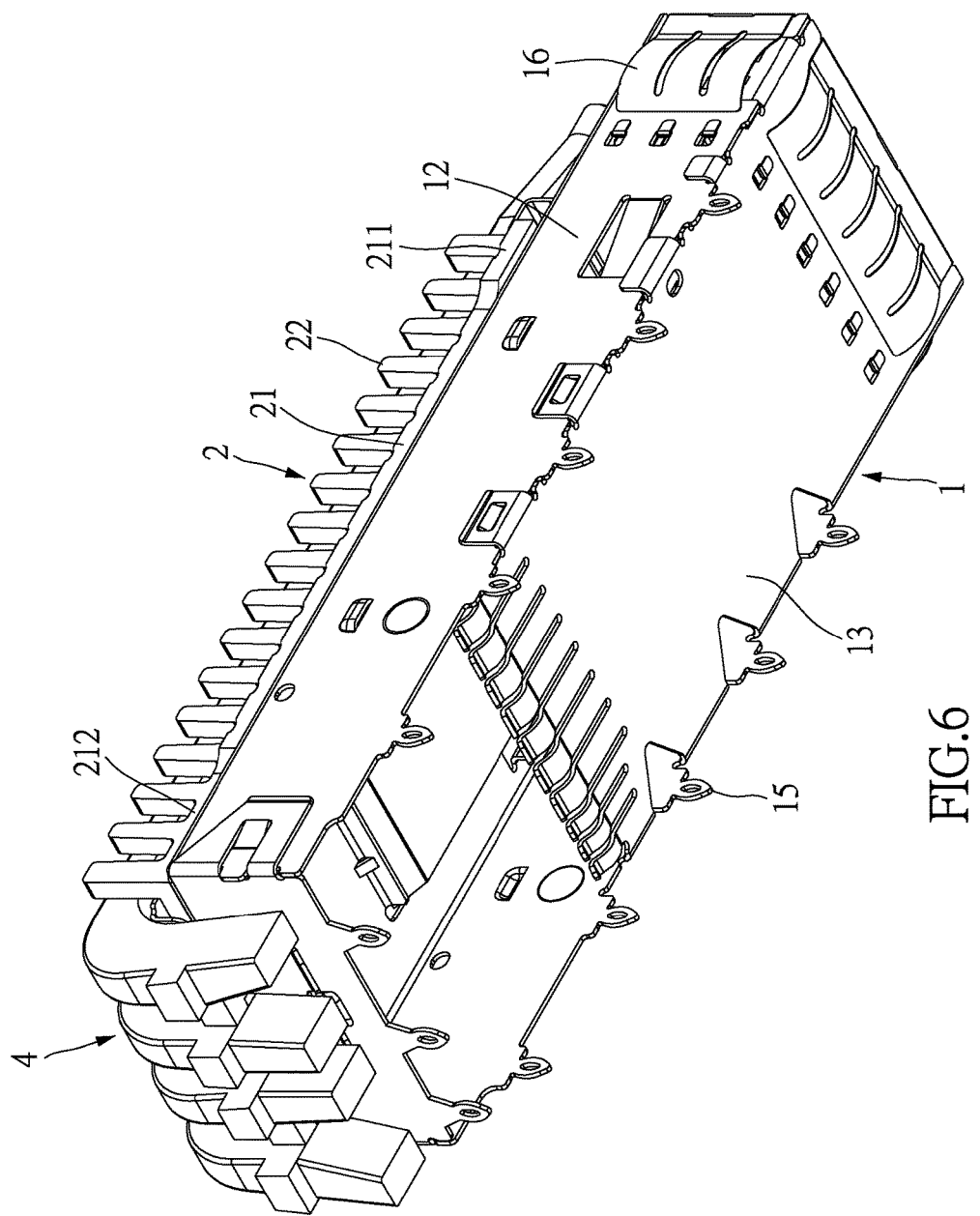
FIG. 6 shows an another perspective view of the connector housing with heat dissipation structure according to the first embodiment of the instant disclosure.
Figure 7:
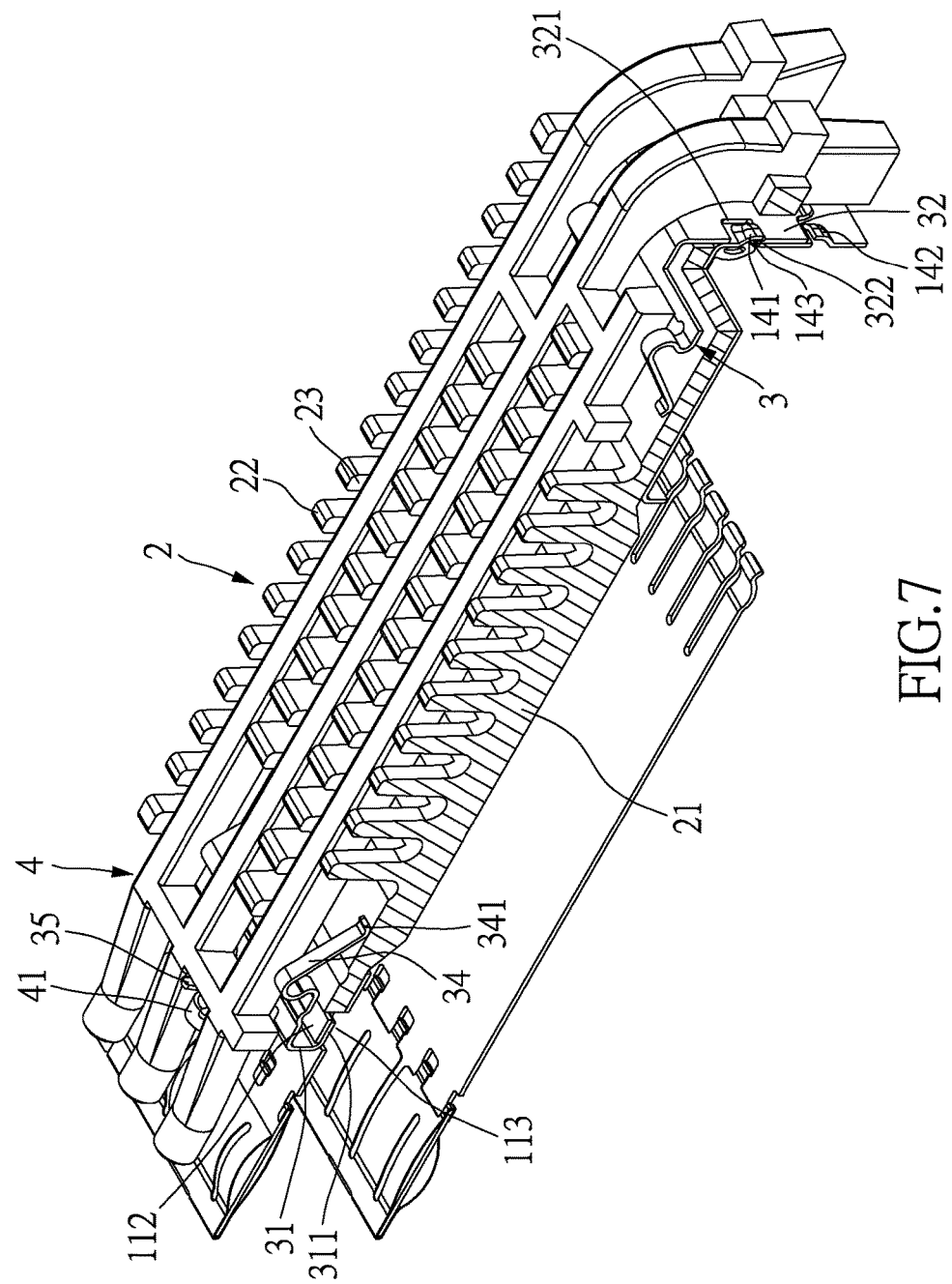
FIG. 7 shows a cross-sectional view of the connector housing with heat dissipation structure according to the first embodiment of the instant disclosure.

Please refer to FIGS. 1 and 2. The instant disclosure provides a connector housing with heat dissipation structure meeting the Quad Small Form-factor pluggable transceiver module specification, and may be, but not limited to, available in 1×1, 1×2, 1×3, 1×4, 1×5, and 1×6 configurations. The connector housing with heat dissipation structure of the present invention includes a housing 1, a heat dissipation unit 2, and a holding member 3. The width of the housing 1 is varied and can be modified as needed, such as 1×1~1×6 configurations. Similarly, the number of the heat dissipation unit 2 and the holding member 3 may be one, or more than one. In this embodiment, the connector housing is with 1×1 configuration, and the number of the housing 1, the heat dissipation unit 2, and the holding member is one.

The housing 1 is made of metal, includes a top plate 11, two side walls 12, a bottom plate 13, and a back cover 14. The top plate 11, the two side walls 12, the bottom plate 13, and the back cover 14 are with a plate-like shape, and the two side walls 12 are connected between both sides of the top plate 11 and both sides of the bottom plate 13. The back cover 14 is connected to the top plate 11, two side walls 12, and the back end of the bottom plate 13 to form a housing 1 with an opening located in the front end.

The bottom sides of the two side walls 12 and back cover 14 further include a plurality of pins 15 to plug into and fix on the printed circuit board. The front end of the housing 1 is formed with a ground spring 16, and the ground spring 16 projects outward to contact a grounding, so as to provide EMI shielding effect. Similarly, the housing 1 envelopes a connector (not shown) to prevent EMI effect.

The top plate 11 is formed with an orifice 111 disposed between the front end and the back end of the top plate 11. The orifice 111 penetrates through the top plate 11, and the orifice 111 may be, but is not limited to, a rectangle shape. The top plate 11 is formed with a fasten piece 112. The number of the fasten piece 112 may be, but is not limited to, two. The two fasten pieces 112 are disposed in front of the orifice 111, more specifically, the two fasten pieces 112 are disposed between the front end of the top plate 11 and the orifice 111. The two fasten pieces 112 are made by the manner of punch out from the top plate 11, so the two fasten pieces 112 project outward from the top plate 11. Two ends (the left end and the right end) of the fasten piece 112 are connected to the top plate 11, and the inner part of the fasten piece 112 is formed with a first slot 114, the front end and the back end of the fasten piece 112 are formed with an opening respectively. An opening 113 is formed on the top plate 11 corresponding to the fasten piece 112, in other words, the opening 113 is located below the fasten piece 112 and penetrates through a front end and the back end of the housing 1. The fasten piece 112 is punched out to form with the opening 113.

The back cover 14 includes the convex hull 141 and the stop part 142, the number of the convex hull 141 and the stop part 142 may be, but is not limited to, one. The back cover is punched out to form with the convex hull 141. The convex hull 141 projects outward from the back cover 14, and the interior space of the convex hull 141 is formed with a second slot 143, and the bottom side of the convex hull 141 is formed with an opening. The stop part 142 is disposed below the convex hull 141 and projects outward from the back cover 14.

The heat dissipation unit 2 is made of metal with good thermal conductivity, and the width of the heat dissipation unit 2 is equal or greater than the width of the housing 1. The heat dissipation unit 2 includes a base 21 and a plurality of fins 22, and the base 21 is with a rectangle shape. More specifically, both sides of the base 21 are formed with a protruding portion 211 and a concave portion 212 respectively. The protruding portion 211 projects outward from the base 21 along a horizontal direction, whereas the concave portion 212 recesses inward to the base 21 along the horizontal direction, and the protruding portion 211 and the concave portion 212 are intersected with each other. In other words, the protruding portions 211 on both sides are adjacent to the front end and the back end of the base 21 respectively.

The fins 22 are connected to the base 21 and extend upward from the top side of the base 21. The fins 22 are arranged in multiple rows, and a plurality of trenches 23 are formed between the fins 22, and the trenches 23 extending along the arrangement of the fins. A conducting block 24 is disposed in the bottom side of the base 21, in other words, the conducting block 24 projects outward from the bottom side of the base 21. The heat dissipation unit 2 is disposed on the top plate 11 of the housing 1, so the conducting block 24 penetrates through the orifice 111 and enters the inner space of the housing 1, and is connected to the connector (e.g. optical transceiver, not shown) disposed inside the housing 1 to dissipate the heat.

The holding member 3 is made of metal with good thermal conductivity. The holding member 3 engages with the housing 1 to secure the heat dissipation unit 2 on the housing 1. The holding member 3 includes a first end part 31, a second end part 32, two side arms 33, and a plurality of springs 34. The two side arms 33 are arranged at regular intervals and parallel to each other. The cross section of the side arms 33 is with a U shape. In this embodiment, the side arm 33 has an upper portion 331, a lower portion 332 and a middle portion 333. The upper portion 331 and the lower portion 332 are with a plate-like shape, and the upper portion 331 and the lower portion 332 are arranged at regular intervals and parallel to each other. The middle portion 333 is connected to one side of the upper portion 331 and one side of the lower portion 332 to form a structure with a U shape. One end (the front end) of the two side arms 33 are connected to the first end part 31, another end (the back end) of the two side arms 33 are connected to the second end part 32 to form a frame structure.

The first end part 31 is substantially with an inverted L plate-like shape, and the front end of the first end part 31 is bent to form a first tongue piece 311. In other words, the front end of the first end part 31 extends toward the second end part 32 to form the first tongue piece 311. The first tongue piece 311 is with a horizontal plate-like shape, and the number of the first tongue piece 311 may be, but is not limited to, two, and the two first tongue pieces 311 are corresponding to the two fasten pieces 112. The front end of the first end part 31 is further bent to form a supporting portion 312, and the number of the supporting portion 312 may be, but is not limited to, two, and the supporting portions 312 are located at one side of the first tongue piece 311. In other words, two supporting portions 312 are disposed at one side of the two tongue pieces 311. The front end of the first end part 31 extends toward the second end part 32 to form the supporting portion 312, and the supporting portion 312 is with a horizontal plate-like shape. The second end part 32 is substantially with an inverted L plate-like shape, and a hatch 321 is formed in the second end part 32. The hatch 321 may be, but is not limited to, a rectangle shape. The bottom side of the hatch 321 is formed with a second tongue piece 322, and the number of the second tongue piece 322 may be, but is not limited to, one, and the second tongue piece 322 is with a vertical plate-like shape. The bottom side of the hatch 321 extends upward to form the second tongue piece 32. The bottom side of the second end part 32 is formed with an arrival end 323. Preferably, the arrival end 323 is disposed in the middle portion of the bottom side of the second end part 32, so the stop part 142 is matched with the arrival end 323 to provide a fixing effect.

The first end part 31 and the second end part 32 are formed with a spring 34 respectively. Preferably, the first end part 31 and the second end part 32 may be formed with, but not limited to, two springs 34. The springs 34 formed in the first end part 31 are corresponding to the springs 34 formed in the second end part 32, in other words, the springs 34 extend toward the inner side of the holding member 3. The springs 34 are bent to form with an inverted V shape, so the springs 34 project upward, and one end of the springs 34 is formed with a front portion 341 to abut against the base 21 of the heat dissipation unit 2.

Please refer to FIG. 1 to FIG. 7. When the holding member 3 is fixed to the housing 1, the holding member 3 is sloped at a predetermined angle, so the two first tongue pieces 311 of the first end part 31 of the holding member 3 insert into the first slot 114 of the two fasten pieces 112 of the housing 1, and the first end part 31 of the holding member 3 secures to the top plate 11 of the housing 1, and the two supporting portions 312 of the first end part 31 abut against the top plate 11 of the housing 1. The holding member 3 is disposed horizontally, so the side arms 33 of the holding member 3 are accommodated into two of the trenches 23 of the heat dissipation unit 2, and the second tongue piece 322 of the second end part 32 of the holding member 3 inserts into the second slot 143 of the convex hull 141, and the arrival end 323 of the second end part 32 abuts against the stop part 142, so the second end part 32 of the holding member 3 is fixed to the back cover 14 of the housing 1. The holding member 3 is fixed to the housing 1 by a locking structure described above, and the heat dissipation unit 2 is secured to the top plate 11 of the housing 1 by means of the springs 34.

In this embodiment, the first end part 31 and the second end part 32 further include a fixing part 35 respectively. The fixing part 35 is with a U shape to secure a light pipe 4 for providing light. The light pipe 4 is disposed on the holding member 3, and the light pipe 4 may be, but is not limited to, arranged at single mode, twin mode, or four mode, in this embodiment, four mode light pipes 4 are arranged. A front end and a back end of the light pipe 4 are formed with a pillar 41 respectively, and the pillar 41 is corresponding to the fixing part 35. The pillar 41 engages with the fixing part 35, so the light pipes 4 are fixed to the holding member 3. The light pipes 4 are accommodated into the trenches 23 of the heat dissipation unit 2. In another embodiment, the light pipe 4, the pillar 41, and the fixing part 35 can be omitted to form a locking structure without the light pipe.

[Second Embodiment]

Figure 8:
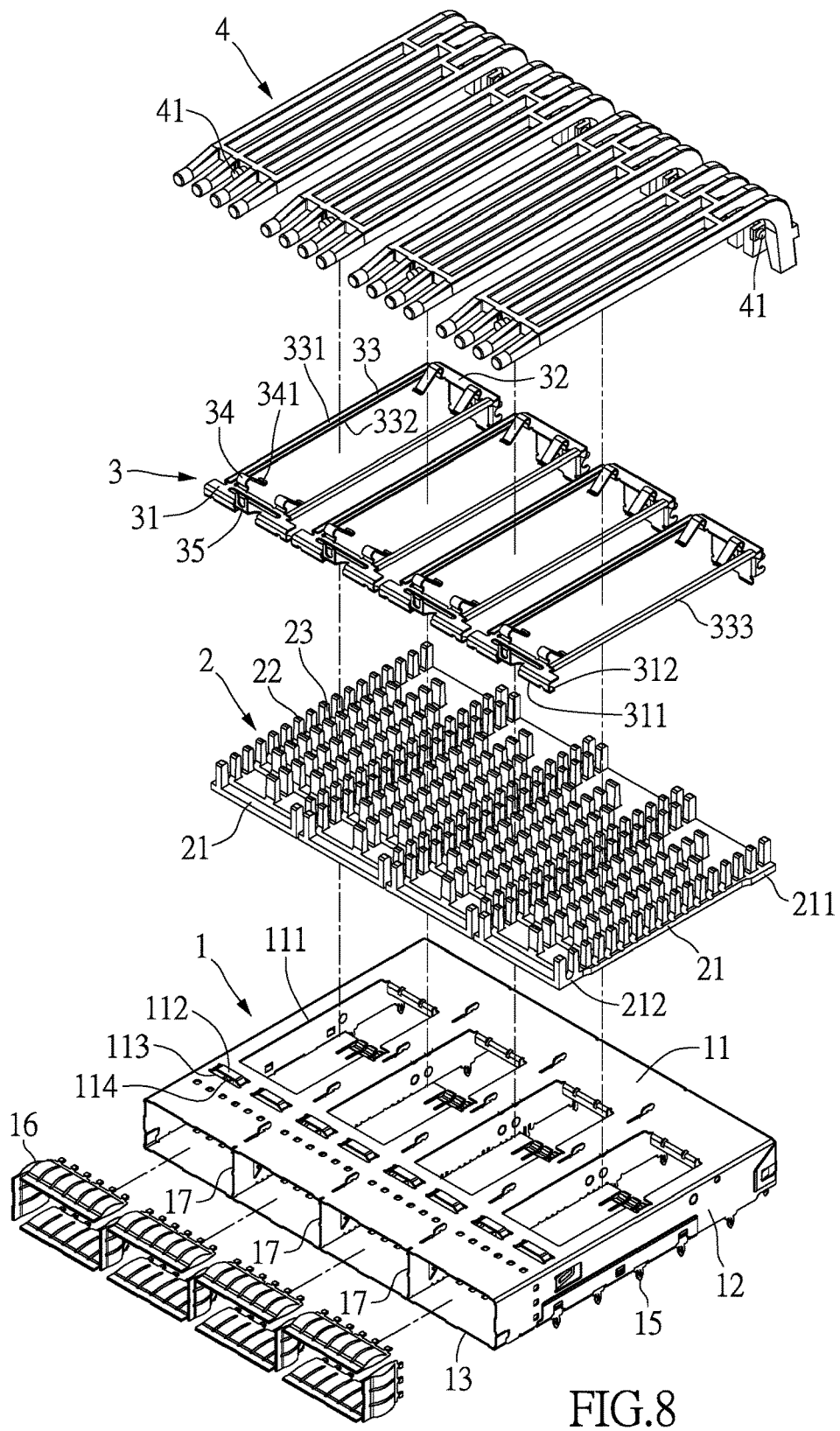
FIG. 8 shows an exploded view of the connector housing with heat dissipation structure according to a second embodiment of the instant disclosure.
Figure 9:
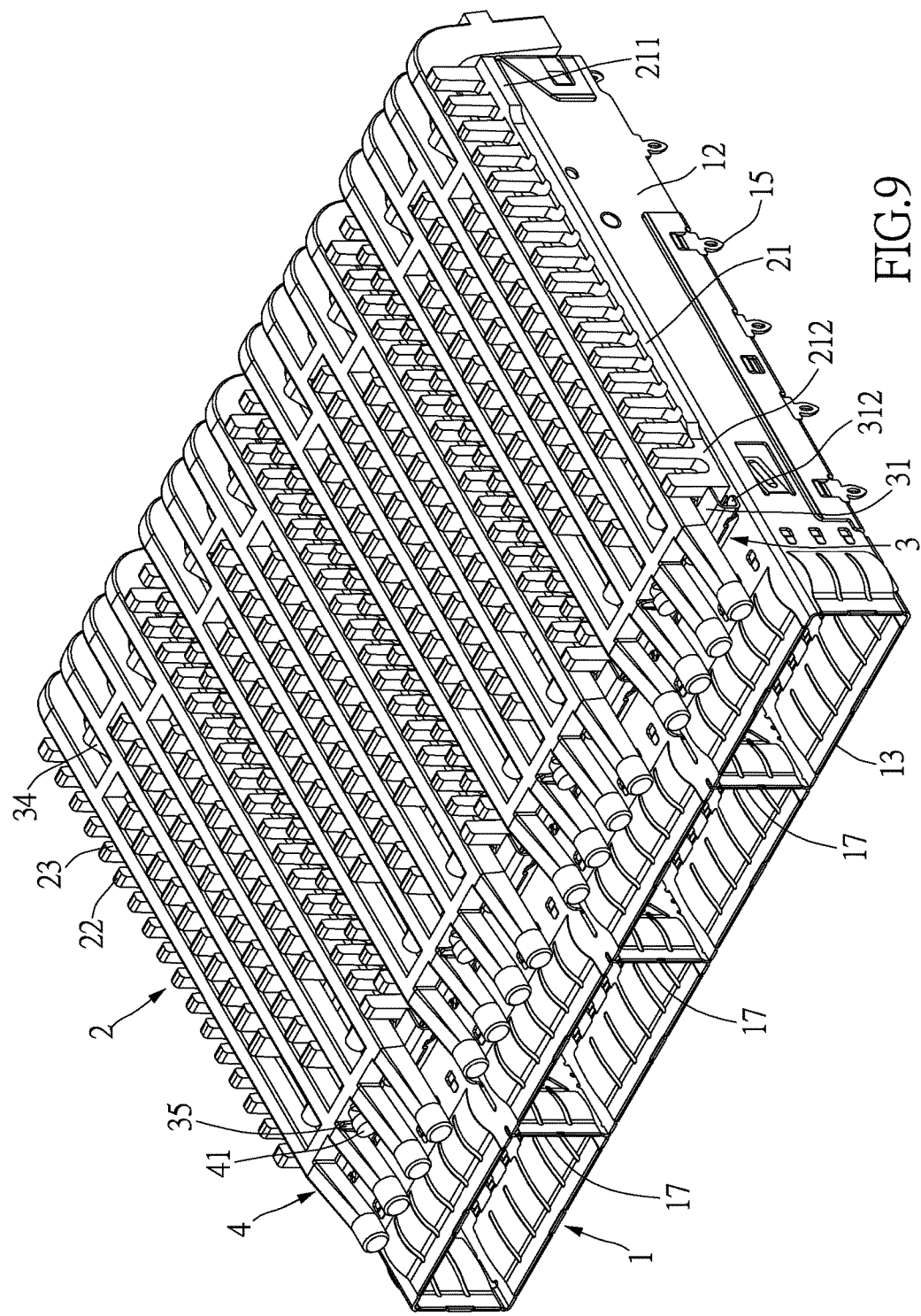
FIG. 9 shows a perspective view of the connector housing with heat dissipation structure according to a second embodiment of the instant disclosure.

Please refer to FIGS. 8 and 9. The inner space of the housing 1 is disposed with at least one division plate 17, the division plate 17 is parallel to the two side walls 12 to divide the inner space of the housing 1 into at least two parts, and at least two heat dissipation units 2 and at least two holding members 3 are arranged accordingly. In this embodiment, a 1×4 configuration is described as follows. The width of the housing 1 is increased, and is about four times that of the 1×1 configuration in the first embodiment, and four heat dissipation units 2 and four holding members 3 are arranged accordingly. In this embodiment, three division plates 17 are arranged, and the number of the division plates 17 may be, but is not limited to, one, two, four, or five. The number of the orifice 111 of the housing 1, the fasten piece 112, the opening 113, the convex hull 141, the stop part 142, the pin 15, and the ground spring 16 are increased as required to set up the heat dissipation units 2 and the holding member 3.

Both sides of the base 21 of the heat dissipation units 2 are formed with a protruding portion 211 and a concave portion 212 intersected with each other. When a plurality of the heat dissipation units 2 are arranged side by side, the protruding portion 211 of the heat dissipation unit 2 matches with the concave portion 212 of another heat dissipation unit 2, so the adjacent heat dissipation units 2 are assembled into one body, and the heat dissipation units 2 touch the division plates 17.

The connector housing with heat dissipation structure of the present invention has advantages as follows.

1. The first end part 31 is fixed to the top plate 11 of the housing 1 by means of the engagement between the first tongue piece 311 and the fasten piece 112, so the area of the opening 113 is decreased enhancing the EMI shielding effects.

2. The side arm 33 of the holding member 3 penetrates through the trench 23 of the heat dissipation unit 2, so the width of the heat dissipation unit 2 is not limited, and the width of the heat dissipation unit 2 can be increased, and the heat dissipation area of the heat dissipation unit 2 is increased accordingly. The width of the heat dissipation unit 2 can be greater than that of the housing 1 as required, and can be adapted to the 1×2~1×6 configurations.

3. The second tongue piece 322 of the second end part 32 of the holding member 3 inserts into the convex hull 141 of the back cover 14 of the housing 1, and the arrival end 323 of the second end part 32 abuts against the stop part 142, so the holding member 3 is not released easily and can bear an external force to prevent damage.

4. The support portion 312 of the first end part 31 of the holding member 3 abuts against the top plate 11 of the housing 1, so the holding member 3 can bear an external force to prevent damage.

5. The cross section of the side arm 33 of the holding member 3 is bent with a U shape, so the structure strength of the holding member 3 is increased.

6. The holding member 3 of the instant disclosure includes a plurality of springs 34, and the springs 34 provide a good elastic force even if the springs 34 are impacted by an external force. The heat dissipation effect of heat dissipation unit 2 is reliable, and the heat dissipation unit 2 can be modified according to the height of the connector as required.

7. The first end part 31 and the second end part 32 of the holding member 3 comprise a fixing part 35 respectively to secure a light pipe 4, and the holding member 3 can be modified according to the type of the light pipe 4 to adapt to a single mode, twin mode, or four mode light pipes.

8. Both sides of the base 21 of the heat dissipation unit 2 of the instant disclosure have a protruding portion 211 and a concave portion 212 respectively arranged in an interlaced configuration, so a plurality of the heat dissipation units 2 can be integrated as one body, and the heat dissipation area of the heat dissipation unit 2 is increased. The arrangement of the protruding portion 211 and the concave portion 212 can increase the heat dissipation area, and the heat dissipation unit 2 touches the division plate 17, so the housing 1 can bear an external force, and prevent damage and collapse.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A connector housing with heat dissipation structure, comprising:
    a housing made of metal including a top plate, two side walls, a bottom plate, and a back cover, the top plate having an orifice and a fasten piece, the orifice penetrated through the top plate, the fasten piece disposed in front of the orifice, the fasten piece protruded outward from an outer surface of the top plate, and two ends of the fasten piece connected to the top plate, a first slot formed inside the fasten piece, a front side and a back side of the fasten piece formed with a recess respectively, the top plate formed with an opening below the fasten piece, the back cover having a convex hull and a stop part, and the convex hull and the stop part protruded outward from an outer surface of the back cover, and a second slot formed inside the convex hull, and bottom side of the convex hull formed with an opening, the stop part disposed below the convex hull;
    a heat dissipation unit having a base and a plurality of fins connected to the base, a plurality of trenches formed between the fins, and the trenches disposed between the fins, two sides of the base formed with a protruding portion and a concave portion respectively, and the protruding portion extended outward from the base along a horizontal direction, the concave portion extended inward in the base along the horizontal direction, the protruding portion and the concave portion arranged in intersected arrangement, and the protruding portions of two sides of the base adjacent to a front end and a back end respectively, the concave portions of two sides of the base adjacent to the front end and the back end of the base respectively, a conducting block disposed in a bottom side of the base, the heat dissipation unit disposed on the top plate of the housing, so the conducting block penetrates through the orifice and enters an interior space of the housing; and
    a holding member having a first end part, a second end part, and two side arms, the two side arms arranged spaced from each other, one end of the two side arms connected to the first end part, another end of the two side aims connected to the second end part, a front end of the first end part formed with a first tongue piece, the second end part formed with a hatch, and a second tongue piece formed in a lower portion of the hatch, an arrival end formed in a lower portion of the second end part, the first end part and the second end part formed with a spring respectively, the spring having a front portion;
    wherein the first tongue piece of the first end part of the holding member is inserted into the first slot of the fasten piece, and the two side arms of the holding member are accommodated into the trenches of the heat dissipation unit, the second tongue piece of the second end part of the holding member is inserted into the second slot of the convex hull, and the arrival end of the second end part is abutted against the stop part, the front portion of the spring is abutted against the base of the heat dissipation unit, so the heat dissipation unit is fixed to the top plate of the housing,
    wherein at least one division plate is disposed inside the housing, and the at least one division plate is parallel to the two side walls and is configured to divide the interior space of the housing into two sub interior spaces, and at least two heat dissipation units and at least two holding members are corresponding to the two sub interior spaces; and
    wherein at least two heat dissipation units are arranged in parallel, and the protruding portion and the concave portion of the two heat dissipation units are abutted against each other, and the two heat dissipation units touch the division plate.

2. The connector housing with heat dissipation structure according to claim 1, wherein the number of the fasten pieces and the first tongue pieces is two, and the two fasten pieces are with a horizontal plate-like shape, and the two first tongue pieces are extended from the front end of the first end part toward the direction of the second end part, the second tongue piece is with a vertical plate-like shape, and the second tongue piece is extended from the lower portion of the hatch toward an upper direction.

3. The connector housing with heat dissipation structure according to claim 2, wherein the front end of the first end part is bent to form with two supporting portions, and the two supporting portions are disposed on one side of the two first tongue pieces, the two supporting portions are with a plate-like shape, and the two supporting portions are abutted against the top plate of the housing.

4. The connector housing with heat dissipation structure according to claim 1, wherein the arrival end is disposed in a middle section of a lower portion of the second end part, and the stop part is corresponding to the arrival end.

5. The connector housing with heat dissipation structure according to claim 1, wherein the spring is bent and with an inverted V shape, the spring is protruded upward, and the front portion is formed on one end of the spring.

6. The connector housing with heat dissipation structure according to claim 1, wherein the first end part and the second end part include a fixing part respectively, a light pipe is disposed on the top side of the holding member, and a front end and a back end of the light pipe include a pillar respectively, the pillar is fastened to the fixing part, and the light pipe is accommodated into the trench of the heat dissipation unit.

7. The connector housing with heat dissipation structure according to claim 1, wherein at least one of the side arms includes an upper portion, a lower portion, and a middle portion, the upper portion and the lower portion are in a plate-like shape, and one side of the middle portion is connected to the upper portion and another side of the middle portion is connected to the lower portion.

* * * * *